US010684349B2

(12) United States Patent
Colucci et al.

(10) Patent No.: US 10,684,349 B2
(45) Date of Patent: Jun. 16, 2020

(54) ENHANCED INDOOR LOCALIZATION METHOD

(71) Applicant: NEXTOME S.r.l., Valenzano (IT)

(72) Inventors: Domenico Colucci, Noci (IT); Vincenzo Dentamaro, Bari (IT); Paolo Giglio, Rutigliano (IT); Giangiuseppe Tateo, Conversano (IT)

(73) Assignee: NEXTOME S.R.L., Valenzano (Bari) (IT)

( * ) Notice: Subject to any disclaimer, the term of this patent is extended or adjusted under 35 U.S.C. 154(b) by 435 days.

(21) Appl. No.: 15/025,420

(22) PCT Filed: Oct. 2, 2014

(86) PCT No.: PCT/IB2014/065022
§ 371 (c)(1),
(2) Date: Mar. 28, 2016

(87) PCT Pub. No.: WO2015/049660
PCT Pub. Date: Apr. 9, 2015

(65) Prior Publication Data
US 2016/0238690 A1 Aug. 18, 2016

(30) Foreign Application Priority Data
Oct. 2, 2013 (IT) .............................. BA2013A0065

(51) Int. Cl.
*G01S 5/02* (2010.01)
*G01S 1/68* (2006.01)
*G01S 5/10* (2006.01)

(52) U.S. Cl.
CPC .............. *G01S 5/0252* (2013.01); *G01S 1/68* (2013.01); *G01S 5/0257* (2013.01);
(Continued)

(58) Field of Classification Search
CPC ..... G01S 5/0252; G01S 5/0263; G01S 5/0257
(Continued)

(56) References Cited

U.S. PATENT DOCUMENTS 7,020,475 B2 * 3/2006 Bahl .................... G01C 21/206
 342/450
7,250,907 B2 * 7/2007 Krumm ................ G01C 21/206
 342/451
(Continued)

FOREIGN PATENT DOCUMENTS

CN 103096466 A 5/2013

OTHER PUBLICATIONS

Liu, J., Chen, R., Pei, L., Guinness, R., & Kuusniemi, H. (2012). A Hybrid Smartphone Indoor Positioning Solution for Mobile LBS. Sensors (Basel, Switzerland), 12(12), 17208-17233. (Year: 2012).*
(Continued)

*Primary Examiner* — Gregory C. Issing
(74) *Attorney, Agent, or Firm* — Arent Fox LLP

(57) ABSTRACT

The present invention relates to a method for indoor localization of a user equipped with a localization device having electromagnetic signal receiver means and means for detecting the orientation in a predetermined spatial reference system, wherein the indoor space is divided up into a plurality of rooms each of which includes a plurality of spatial volumes or areas, nodes, which are connected together in a directed-graph arrangement, and wherein a plurality of radio transmitters each designed to emit a respective localization signal are arranged inside this space. The method is based on the synergic use of three localization methods, i.e. fingerprinting, inertial navigation with intelligent step recognition and proximity localization.

11 Claims, 3 Drawing Sheets

(52) U.S. Cl.
CPC ........... *G01S 5/0263* (2013.01); *G01S 5/0294* (2013.01); *G01S 5/10* (2013.01)

(58) Field of Classification Search
USPC ........................................................ 342/451
See application file for complete search history.

(56) References Cited

U.S. PATENT DOCUMENTS

| | | | | |
|---|---|---|---|---|
| 7,346,359 | B2* | 3/2008 | Damarla | G01S 5/0252 |
| | | | | 455/404.2 |
| 7,525,484 | B2* | 4/2009 | Dupray | G01S 1/026 |
| | | | | 342/450 |
| 8,022,876 | B2* | 9/2011 | Huang | G01S 5/0252 |
| | | | | 342/451 |
| 8,325,090 | B2* | 12/2012 | Luo | G01S 5/0263 |
| | | | | 342/451 |
| 8,436,772 | B2* | 5/2013 | Meyer | G01S 5/0252 |
| | | | | 342/450 |
| 9,198,003 | B2* | 11/2015 | Marti | G06F 3/048 |
| 2005/0156782 | A1 | 7/2005 | Whelan et al. | |
| 2010/0109842 | A1 | 5/2010 | Patel et al. | |
| 2010/0127935 | A1 | 5/2010 | Huang et al. | |
| 2010/0134356 | A1 | 6/2010 | Huang et al. | |
| 2011/0250904 | A1 | 10/2011 | Valletta et al. | |
| 2013/0162481 | A1* | 6/2013 | Parvizi | G01S 3/023 |
| | | | | 342/452 |
| 2013/0172020 | A1 | 7/2013 | Aweya et al. | |

OTHER PUBLICATIONS

Shala, U. et al. "Indoor Positioning Using Sensor-Fusion in Android Devices." School of Health and Society Department Computer Science Embedded Systems. Sep. 2011. pp. 1-58. (Year: 2011).*
Evennoou, F. et al. "Advanced Integration of WiFi and Inertial Navigation Systems for Indoor Mobile Positioning." Hindawi Publishing Corporation EURASIP Journal on Applied Signal Processing vol. 2006, Article ID 86706, pp. 1-11. (Year: 2006).*
International Search Report PCT/IB2014/065022 dated Mar. 10, 2015.
Written Opinion for PCT/IB2014/065022.

* cited by examiner

ENHANCED INDOOR LOCALIZATION METHOD

CROSS-REFERENCE TO RELATED APPLICATIONS

This application is a National Stage entry of International Application No. PCT/IB2014/065022, filed Oct. 2, 2014, which claims priority to Italian Application No. BA2013A000065, filed Oct. 2, 2013, the entire contents of each of which are incorporated herein in their entirety by reference.

The present invention relates to localization systems and more specifically to a method and a system for indoor localization.

Hitherto localization systems allowing localization of a system user with a high degree of precision and reliability inside closed spaces, i.e. indoors, have not been developed.

In the prior art there exist different localization methods, such as:
- trilateration of the RSSI (Received Signal Strength Information),
- fingerprinting
- dead reckoning with particle filtering and inertial navigation.

US patent applications US 2010/127935 A1 and US 2010/134356 A1 describe an indoor localization method based on the distribution of beacons designed to transmit localization signals which can be received by a receiver associated with an object or person whose position is to be determined. The localization method described is based on the preliminary execution of a training step during which signal vectors are generated from the localization signals received by a receiver arranged in predetermined positions in a closed space and on the real-time execution of a receiver tracking step during which signal vectors are generated from the localization signals received by the receiver in the current position. A comparison of the signal vectors allows the receiver position to be estimated. This estimation is carried out in a remote processor linked both to the beacons and to the receiver device.

The fingerprinting technology described in US 2010/127935 A1 and US 2010/134356 A1 has the drawback that it does not take into account the orientation of the user.

The patent application US 2011/250904 A1 describes an indoor localization system for localization of a mobile electronic device. The system includes a plurality of transmitting nodes arranged in a closed space and designed to emit radiofrequency signals on at least two different radio channels which can be received by the mobile electronic device. The localization method is based on fingerprinting technology, namely on a comparison of the power of the signals received by the mobile device in its current position with reference values for the power of the same signals determined during a training step.

US 2011/250904 A1 also has the drawback that it does not take into consideration the spatial orientation of the device to be localized.

In any case the cited prior art deals with the problem of indoor localization by means of application of fingerprinting technology, which is not effective in the case where a user, provided with a localization device designed to receive the localization signals emitted by transmitters arranged in this closed space, is in the immediate vicinity of one of these transmitters or is moving between different rooms existing within the closed space.

US 2013/0162481 discloses systems and methods for calibrating indoor geolocation by excluding transient signal, i.e. transmitters that are deemed to be not reliable for performing fingerprinting. A reliability of a fingerprint to be associated with a map point is computed based on, at least in part, a comparison of a parameter associated with the map point with reference data associated with the indoor location such as topology of the location, and speed and orientation of the user.

US 2010/109842 discloses an indoor location system using an electrical power line, power line signal injection devices and portable position receivers (tags) to generate location data relating to positions of the tags in a structure such as a residence or business, so as to achieve sub-room-level localization of the positioning receivers.

CN 103 096 466 discloses a Wi-Fi indoor positioning method including a support vector machine classifier to position a point to be detected that receives a wireless signal strength value sent by a wireless connection point, to a corresponding sub-region.

To summarize, the current indoor localization systems have the following drawbacks:
- lower localization precision;
- no evaluation of the orientation of the user;
- localization carried out in a centralized manner separately from the devices receiving the localization signals of the beacons.

The object of the present invention is to overcome the drawbacks and shortcomings of the current known indoor localization technology so as to provide an indoor localization system with more reliable and more precise localization.

A further object of the present invention is to provide a system for indoor localization of a user of the same localization service or a device in his/her possession, when said user with said device is moving inside well-defined and delimited closed spaces.

According to the present invention these objects are achieved by means of a localization method having the characteristic features defined in Claim 1.

Particular embodiments form the subject of the dependent claims, the contents of which are to be understood as forming an integral part of the present description.

In short, the present invention is based on the principle of providing an indoor localization system of a user of the same localization service or a localization device in his/her possession, when said user is moving with said device inside closed spaces, said system having a high degree of precision and reliability owing to the use of three localization methods, such as fingerprinting, inertial navigation with intelligent recognition of the movement of the user/localization device and recognition of a proximity location, said methods being employed in a synergic manner.

The inventive idea of the present invention consists in achieving the synergic application of said three localization methods such that it is possible to solve the problem of localizing, with a high degree of precision and reliability, a user of a localization service in order to define also in real time his/her position and precise path within a closed space; it being possible to define with the maximum reliability and precision all the single movements performed from an initial starting point to an end point along a trajectory, the position of the said user being detected by means of minimum units for subdivision of the closed space and/or the internal rooms thereof, which are connected together in a data structure of the directed-graph type.

As a result, advantageously, it is possible to obtain a high degree of reliability and precision in terms of localization of the user, with real-time tracking of his/her position inside a closed space, while at the same time ensuring a minimum energy consumption and, correspondingly minimum electromagnetic pollution.

The method according to the present invention may be advantageously implemented using a mobile personal electronic device such as a smart phone, a tablet, a phablet, a latest generation PDA or other functionally and technologically equivalent devices which preferably have access to Bluetooth 4 low energy technology (also called Bluetooth Smart), equipped with orientation means, such as a gyroscope, accelerometer, compass and radiocommunication means such as GPRS/EDGE/3G/4G or WiFi connectivity.

Conveniently the present system makes use of a plurality of permanently active and detectable beacons-slave transmitters which are provided with Bluetooth 4 low energy technology and are arranged in predetermined sites inside the space where the localization method is used.

The objects for which the present localization system has been invented are as follows:

maximum reliability and precision when localizing the user;

real-time tracking of the actual position of the user within a delimited closed space;

minimum energy consumption and, correspondingly, minimum electromagnetic pollution (green technology);

minimum production and installation costs;

ease of use by using recent mobile devices, such as smart phones, tablets, phablets, latest generation PDAs and other functionally and technologically equivalent devices with access to Bluetooth 4 low energy (Bluetooth Smart) technology or other technologies equipped with a gyroscope, accelerometer, compass and GPRS/EDGE/3G/4G or WiFi connectivity;

use of permanently detectable beacons-slave transmitters provided with Bluetooth 4 low energy technology.

These objects and the consequent advantages and characteristic features of the present indoor localization system will become clearer from the following detailed descriptions of preferred embodiments provided merely by way of a non-limiting example and illustrated in the accompanying drawings in which.

Figure 1:
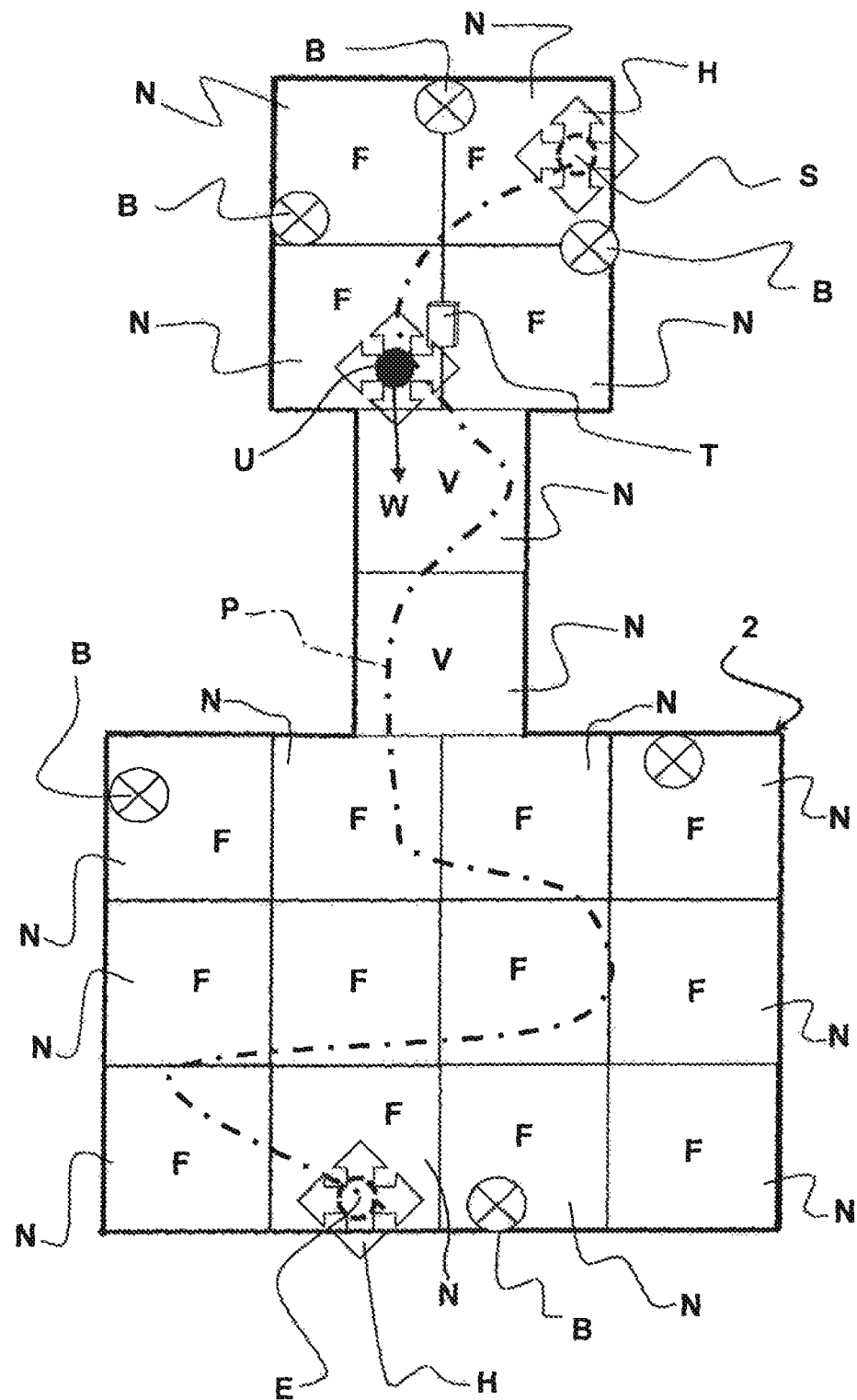
FIG. 1 is a schematic plan view of a localization system installed inside a generic delimited closed space.

A generic delimited closed space 2 comprises one or more rooms, which are divided into a plurality of areas or volumes N, identified below as nodes, each of which is indicated in FIG. 1 according to the identification type, i.e. fingerprinting F, Gate V or orientation H type, in order to localize a user U—equipped with a localization device—from a starting point S along a path P to the end point E of the path P, with associated tracking of the said path P followed by the user U.

Figure 2:
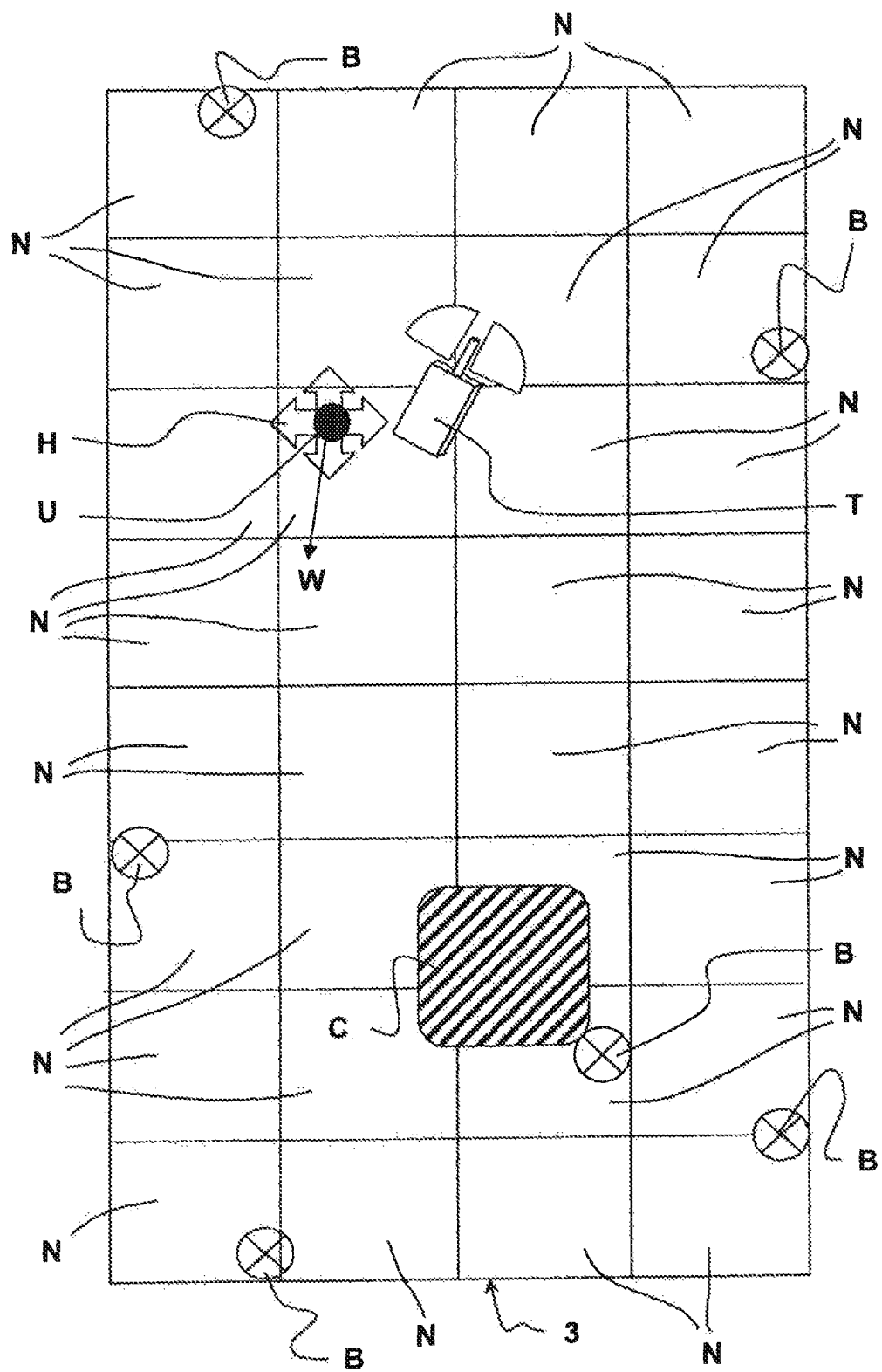
FIG. 2 is a schematic plan view of a localization system according to the invention applied to a different limited closed space having an obstacle internally.

FIG. 2 shows a similar limited closed space 3 having internally an obstacle such as a pillar or a column C (anti-node) which—as an alternative to the configuration of FIG. 1—is divided up into areas or volumes G, identified below as grids, although the function of the grids G is equivalent to that of the nodes N in FIG. 1.

In the figures, B indicates a plurality of radio transmitters or Bluetooth low-energy beacons which are designed to emit electromagnetic localization signals which can be received by a localization device T, for example a localization device associated with a user U, such as a smart phone, configured to carry out a method for searching for and receiving the localization signals emitted by the transmitters (beacons) B, and a method for spatial orientation of the said device.

The localization techniques used in a synergic manner in the method according to the invention are described below.

The first localization model is a procedure named graph-based Bluetooth Smart fingerprinting with device orientation and allows localization of a user at the centroid of a square node N of predetermined dimensions, as schematically shown in FIG. 1.

The map of the delimited closed space is divided up into a plurality of areas or volumes indicated as nodes "N".

As can be seen from said diagram in FIG. 1, the map of the closed space 2 where localization is to be performed is divided into square nodes N, not necessarily of the same size, but with each side having predetermined dimensions depending on the degree of precision which is to be achieved. When the user U is localized inside the area of a node N, automatically he/she is localized at the centre of the said node N. Square nodes N must not be created where there are walls or spaces which cannot be reached or cannot be localized. Each node N may communicate at the most only with another 4 adjacent nodes.

Said solution mentioned above is obviously intended to be used where it is not required to perform a volumetric subdivision into nodes of the said closed space inside which the user U is to be localized. In this latter case it is sufficient to divide up said closed space 2 in which the user U is to be localized into cubic nodes. Obviously, in the simpler case of a closed space divided up into volumetric nodes of the same size, each node will have twenty six adjacent nodes, thus increasing the reliability of localization of the system 1.

The data structure resulting from the division of the closed space 2 into nodes N is an "unweighted" graph having as nodes N the "square nodes" previously created and as arcs the references to the four nodes adjacent to the selected node N. Said graph-like data structure allows a simplified calculation of the minimum path needed to reach a location inside the closed space 2, without moreover allowing localization of the user in inaccessible locations (where there are for example walls, closed doors, etc.).

After carrying out first of all subdivision of the closed space or site 2 into nodes N, a step is carried out in which a plurality of Bluetooth Smart beacons B are deployed inside the closed space 2 where one wishes to be able to localize a user U of the service.

The entrance doors or gates for accessing the closed room to be monitored and the points passed through by the users are then identified, positioning said plurality of beacons B so as to identify in particular the walls and strategic points of each room in the closed place 2 to be monitored. For example, it has been calculated that the optimum positioning of the beacons B for each room with a maximum area of one hundred and fifty square metres (namely a room with a rectangular layout of 15 m×10 m) involves the use of at least four beacons, although a greater number is nevertheless indicative of a better performance of the localization system 1. In the case where localization must be performed in larger-area rooms, it is possible to consider the latter as being divided up into smaller rooms, i.e. into rooms with an area not greater than one hundred and fifty square metres, at least four beacons B being positioned in each of the rooms.

If it is envisaged using beacons B of the BT Smart type, they must be always positioned at at least three metres from the ground, since emission of the signal is more uniform and less affected by the presence of human beings.

A BT Smart beacon must be positioned for each obligatory access point (such as doors for example). This beacon is not used in a fingerprinting method since it is very sensitive to disturbances due to the presence of users U. The use of said beacon, therefore, is envisaged only in those cases where a gate technique or a method involving proximity sensors is used, as will be described in greater detail in the description below.

Each Bluetooth Smart beacon must be clearly visible and trackable, preferably with an advertising time of three hundred milliseconds. Moreover the minimum power threshold during advertising of the BT Smart beacon must be preferably 4 dB-A or at the most 0 dB-A.

All of this ensures greater stability of the signal detected and improves the general performance of the system.

After this second step, it is possible to apply a "fingerprinting with device orientation" technique, which is in turn composed of two substeps: an off-line training step and an on-line testing step.

During the training step, for each node of the room to be monitored and for each discrete orientation H (for example the orientation North/South/West/East), twenty readings of a pair of MAC/RSSI values of the localization signals emitted by each beacon B present in the room and associated with the fingerprinting procedure (namely only those valid for the procedure and not those situated in the obligatory access points of users) are recorded.

Each orientation is preferably calculated in the following manner: North is understood by the system as relating to angles (in sexagesimal degrees) ranging between −22.5° and 67.4°, East to angles ranging between 67.5° and 157.4°, South to angles ranging between 157.5° and −112.4° and West to angles ranging between −112.5° and −22.4°.

It was considered necessary to record also the orientation of the user U in order to solve the problem due to the fact that the body of the person performing the recordings itself causes in that node signal reflection and attenuation phenomena which alter the real power of said signal. In this way a result based on the analysis of eighty vectors for each node N is obtained (in FIG. 1 said nodes are defined in each square shown there of the closed place or room 2 to be monitored), where each vector contains the MAC address, namely the RSSI value received during training, in addition to the reference of the node N to which it belongs. All the values scanned are then stored inside a database file which defines in a sectoral manner the room to be monitored, precisely by said subdivision into nodes N, with each of said nodes N closely defined by the vectors associated with it.

In order to check initially the validity of the localization system and then periodically monitor its effectiveness and efficiency it is envisaged carrying out a test step during which the localization device T possessed by the user U performs a scan, for example about every 1.5 or 3 seconds, and retrieves the list of beacons B detected with their RSSI value and memorizes the orientation of the device T at the time of scanning. A MAC/RSSI vector of the beacons B valid in that room is thus constructed.

If during scanning a beacon B is not detected, the RSSI value in its position in the vector will be replaced by a predetermined threshold value (usually the minimum RSSI which may be reached). If, instead, two or more beacons B are not detected, then the entire scan is eliminated and a new scan is performed. After constructing the vector of the detections, all the vectors created during the training step having as orientation the orientation H of the localization device during scanning are recovered. By means of an automatic learning technique, the user is classified inside the node which is formed by the training vectors most "similar" to the test vector (in the K-Nearest Neighbor=KNN this is max{K}).

In the present localization system it was preferred to use the K-Nearest Neighbor technique (the KNN algorithm was parameterized with K equal to five) and as a comparison metric the weighted Manhattan distance is preferably used expressed by the following formula:

$$L(x, x') = \frac{1}{\left(\sum_{i=1}^{N} |x_i - x'_i|\right)^2}$$

It is also possible to use other machine learning techniques in order to solve in an equally efficient manner similar classification problems, such as neural networks or support vector machines (SVM). These machine learning techniques require, however, normalization of the matrix of the features vectors with values which must be between 0 and 1 and −1 and 1 in order to allow the gradient descent and quadratic convergence algorithms to converge more rapidly towards a solution and attribute uniform importance to all the values contained in the vectors.

By means of the SVM a performance about 4% superior to the previously cited KNN is obtained, using an SVM with RBF Kernel and search grid tuning where the latter consists in carrying out various experiments in a grid, varying the parameters "gamma" from 2-15 up to 223 and "c" from 2-15 up to 215. Since both the pre-processing procedure and the training and classification procedure are computationally very costly to process in real time within a mobile device, it is preferable to use a KNN algorithm with a weighted Manhattan distance metric which is lighter from a computational point of view (about 8-10 milliseconds in order to predict the node in which the user is to be localized) and more easily transportable between platforms (e.g. Android, iOS, Windows Phone, Blackberry RIM, etc.,).

Advantageously, it is also envisaged adopting a procedure for removal of the multipath fading effect.

The approach proposed is based on the assumption that the RSSI values recorded by a localization device contain 3 types of signal: the "true" signal y(k) (which is to be extracted), an environmental noise from the k-th beacon and a random Gaussian noise described as the noise of the entire set of RSSI values collected in a single node, which may be represented by the formula:

$y(k)=x(k)+n(k)+m(k)$

The RSSI values recorded may be treated as a Y vector having a length D, where $Y=[y(0),y(1), \ldots y(D-1)]^T$ and where the value D indicates the number of beacons in a room and the superscript T represents the transposed vector.

These real-time vectors are processed, during both the training step and the test step, in order to remove a first type of noise n(k) by means of a singular value decomposition (SVD) technique.

Each RSSI vector received at a time t both during the training step and during the test step is averaged preferably by 4 (or less if there are fewer) preceding RSSI vectors using an exponential moving average (EMA) technique.

$$EMA = (RSSI_t * k) + (EMA(RSSI_{t-1}) * (1-k))$$

$$k = \frac{2}{\text{Number Of Previous Vectors} + 1}$$

The filtered values of RSSI are converted into a Hankel matrix Hp as follows:
$H_Y$ has dimensions L*M, where L+M=D+1 and L≥M.
$H_Y$ is represented as the sum of two matrices in Hankel form $H_Y=H_X+H_N$, where $H_X$ and $H_N$ constitute respectively the matrix containing the partially clean signal and the matrix containing only noise of the n(k) type or environmental noise.

By means of the SVD technique the matrix is decomposed and recomposed without noise of the n(k) type in the following manner: $H_Y$ is decomposed into U∈L*L, V∈M*M, and Σ∈L*M as follows:

$$H_Y = U\Sigma V^T$$

where the columns of the matrices U and V are orthonormal and called respectively left and right singular matrices, and $\Sigma=\text{diag}(c_1, c_2, \ldots, c_p)$ are the singular values of the noisy matrix $H_Y$, where $c_1 \geq c_2 \ldots \geq c_p \geq 0$ e p=min(L, M).

The greater singular value nearly always contains only true signal, while the smaller singular value captures only noise. Therefore the technique for reduction of the noise of the n(k) type may be obtained by attenuating each singular value of Σ with its corresponding value obtained by a diagonal weight matrix W.

$$H_{X''} = U(W\Sigma)V^T$$

Then, it is possible to construct a new matrix $H_X$ which represents the clean RSSI matrix by means of the equation $$H_{X''} = U(W\Sigma)V^T.$$

In order to obtain again the clean RSSI vector from this new matrix, the anti-diagonals are averaged.

In order to create the weight matrix W the minimum variance (MV) technique is used, this assigning a greater weight to the greater values of C and smaller weight to the smaller values of C, more specifically $c_1$ (only signal) and $c_p$ (only noise). In this case the diagonal weight matrix is formulated as follows:

$$W_{MV} = \text{diag}\left(\left(1 - \frac{C_{noise}^2}{C_1^2}\right), \ldots, \left(1 - \frac{C_{noise}^2}{C_p^2}\right)\right)$$

where the noise is characterized by a value $$C_{noise} = \alpha c_p$$

α=(number of beacons in the room*2)/surrounding area
This empirical value depends on the noise level of the environment.

A set of semi-clean vectors X" each belonging to a specific node is thus obtained.

All the vectors which belong to a node are inserted in a matrix $Z_Y$. This matrix is N*M where N is the number of vectors and M is the number of beacons in the room. The matrix $Z_Y$ is the sum of two matrices $Z_Y = Z_{signal} + Z_M$ where $Z_{signal}$ e $Z_M$ are respectively the matrix containing only signal and the matrix containing only random Gaussian noise.

In order to remove the random Gaussian noise, the truncated SVD is performed by means of the reduced-rank approximation technique.

If β is defined as the parameter for calculation of the reduced rank and s is defined as the sum of the singular values of the matrix Σ and ps as the partial sum of the singular values of the matrix Σ, the following pseudo-code represents the operations for calculating the rank of the matrix Σ by means of the parameter β. The matrix $Z_Y$ will be approximated to this rank level.

```
Function LowerRank(array of singularValues, β ){
  Set rank to numberOfSingularValues
  Set s to 0
  foreach(value in singularValues) {
    set s to s + value
  }
  Set ps to 0
  for(i = 1 to numberOfSingularValues ){
    Set ps to ps + singularValues[i-1]
    if(ps divised by s > β) {
      Set rank to i
      Exit from cycle
    }
  }
  return rank;
}
```

Based on the new value of the rank ϱ, the truncated SVD for this rank value ϱ is performed as follows:

$$Z''_Y = U''_\varrho \Sigma''_\varrho V''^T_\varrho$$

where ϱ <=(rank $H_Y$). This operation must be performed for each node. As a result, n new matrices $Z''_Y$ which are the truncated SVD of the dataset for each node and each orientation are obtained.

All the preceding matrices are merged together to produce a new matrix A. The matrix A is a matrix M*N where M is the sum of all the rows contained in the matrices $Z''_Y$ and N is the number of beacons in the room.

The matrix thus obtained is the clean matrix of RSSI values containing almost only signal which will allow the machine learning algorithm such as the SVM or KNN to train on a dataset without noise.

During the test step, since this step is performed directly on the localization device in real time, a time filter will be applied by means of EMA on the vector of RSSI values just recorded, and the SVD by means of the method with the Hankel matrix as illustrated above, and the RSSI vector obtained as output from this technique will be passed inside another time filter, again using the EMA formula by means of a time window of 5 preceding vectors.

The second localization method used is identified as "Gate" and is a procedure which allows localization of a user U at the centroid of a square node N with predetermined dimensions only if the user U is sufficiently close to a transmitter B or if the RSSI value detected by the localization device T is greater than a predetermined threshold for that specific transmitter. This technology is in turn composed of two substeps: a preliminary off-line configuration substep and an on-line operative substep. During the preliminary off-line configuration step, a localization signal transmitter (Bluetooth Smart device) is positioned (if not already done so) high up inside a passageway or at a strategic point of a room (for example in a museum, next to a work of art) or, again high up, in a location where it is considered that there will necessarily be a large influx of users U which cannot be easily controlled.

In the same node N where the BT Smart transmitter B has been placed, a threshold RSSI value for that transmitter is identified. Both the threshold value and the MAC address of the transmitter are saved in a database. The type of transmitter B is different from the type of transmitters B which can be used in a fingerprinting procedure.

As can be seen from the graphical illustration shown in FIG. 1, the nodes N differ from each other in that they are of the fingerprinting type F, orientation type H or Gate type V.

During the on-line step, the localization device T of the user U performs a continuous scan of the localization signals emitted by the transmitters B and, if a transmitter of the Gate type has an RSSI value greater or at the most equal to the threshold value, the user U is localized at the centre of the node N to which the selected transmitter corresponds.

The third localization technique or method used is called IntelliWalk technology and comprises a procedure for tracking the movement of a user designed to trace in real time on a virtual map the position P, the orientation H and the speed W of the user U who is moving (FIGS. 1 and 2).

Basically, this procedure is based on counting of the steps taken by the user and on reading the orientation data of a compass which keeps track of the displacement of the user U (trajectory or path P), if the said user U is walking at a speed W or is at a standstill (W=0 m/s), and identify his/her orientation H. From the real-time acquisition and processing of this data it is possible to define the correlated position and displacement of the user U on a virtual map representing the closed space in real time.

Counting of the user's steps is preferably performed by an intelligent step-counting device which includes a classifier and a peak analyser. The classifier performs classification on the basis of a series of training vectors labelled as 0 or 1, where 0 means that the user is at a standstill and 1 means that the user is moving. Advantageously, this classifier may be extended with another label having a value different from the preceding values, in order to indicate that the user U is moving at a fast speed W. In so doing it is also possible to determine the discrete speed W of the user. The classifier operates in turn during a training step and test step or during actual operation. The training step consists in capturing a plurality of samples, for example 128 samples, at a frequency of at least one hundred Hertz, of the values detected by an accelerometer of the localization device on three-dimensional Cartesian axes (for example, with 128 values for the axis X, 128 for the axis Y and 128 for the axis Z). Each vector will therefore be composed of 128 components per single Cartesian axis, increasing the precision of the localization method.

The reliability of the localization method is further increased by carrying out a filtering procedure, applying a high-performance low-pass filter with the following formula:

$$\forall\, x_i \in X^*,\ x_i = x_i + \frac{(x_i - x_{i-1})}{p}$$

where "$x_i$" is the current value and "$p$" is the smoothing variable. Tests have shown that an improved performance of the localization method is obtained by assigning the value of 12/10 to "$p$".

Therefore, for each axis the following are calculated: the average value, the standard deviation, the median, the Pearson correlation coefficient of 2 adjacent axes (xy, yz, zx) and the variation in acceleration on an axis with respect to the unit of time defined by the following formula:

$$A_{acc} = \frac{\sum_{i=2}^{n} |(a_i - a_{i-1})|}{s}$$

where "$a_i$" is the current acceleration and "$s$" is the unit of time. During tests an optimum performance of the localization system 1 has been determined by setting $s=1.5$, but the value may change depending on the localization device used and the frequency with which the same device performs sampling of the recorded values.

All these values (average value, standard deviation, median, Pearson correlation coefficient, variation of acceleration over time) for each axis form a vector of the features assumed by the user U. Each vector contains 15 features and may belong to the class zero (zero=stationary) or one (one=moving). The procedure is then repeated for a plurality of vectors, for example for at least twenty vectors, in order to determine the walking movement with the label 1, and for example for sixty vectors, in order to determine the stationary condition, sudden movements or rotation about oneself, having the label 0. The vectors thus labelled are saved in a database or in simple rows of text.

The subsequent test step consists in creating the feature vector on the basis of the current state of the user U in order to predict the class of the vector formed, namely predict whether the user U is walking with a speed W or is standing still (W=0 m/s).

During this test step also, in the same way as during the training step, sampling of one hundred and twenty-eight samples with a frequency of at least one hundred Hertz is performed, followed by smoothing by means of a low-pass filter having the same parameters as the training step, thus calculating the discussed features during the training step so as to form a feature vector.

By means of the K-Nearest Neighbor machine learning method with weighted Manhattan distance described above, using for example 5 for the value of "k", the class to which the feature vector just detected belongs is predicted. By means of a good dataset the present localization method is able not only to record the path followed by a user U and the associated features of his/her displacement within the closed environment, but also predict walking of the same user U with a minimum precision of 93%, analysing the data recorded, for example, during the first fifteen minutes of recording from the initial position S to the final position E.

Laboratory tests have shown that, by using SVM instead of KNN with the same training set of KNN, but normalized between −1 and 1, by means of "z-normalization", with RBF kernel and search grid tuning described above, a walking prediction accuracy of up to 99.37% is obtained.

The peak analyser analyses and compares the current values of the accelerations along the three Cartesian vectorial reference axes with respect to the preceding accelerations. If the resultant value recorded is less than a predetermined threshold value, then the algorithm adds one step. Said algorithm is executed only after the classifier has identified the user U and has classified him/her as moving, introducing pause intervals of for example seven hundred milliseconds once said algorithm has been executed.

The algorithm used to perform said analyses is essentially composed of five steps, during which it carries out the following operations in an orderly manner:

Step 1: the classifier evaluates whether the user U is walking at a speed W equal to or different from zero m/s;

Step 2: a processor checks whether the user U is walking by reading the result of the classifier;

Step 3: if the user U is walking and the block timer has expired, the processor carries out the algorithm in step 4, otherwise it returns to step 1;

Step 4: within a module managing the events received from the accelerometer, the processor calculates the following formulae:

$$a = |\sqrt{(x'^2 + y'^2 + z'^2)}|,$$

where x', y' and z' are the preceding values of the instantaneous accelerations on the x, y and z axis, respectively;

$$b = |\sqrt{(x^2 + y^2 + z^2)}|,$$

where x, y and z are the current values of the instantaneous accelerations on the x, y and z axis, respectively;

$$c = (x'*x) + (y'*y) + (z'*z); \text{ and}$$

$$d = \frac{c}{(ab)},$$

where if d is less than or equal to 0.9995 then the step counter is incremented by one step, determining that user has taken one step.

Immediately after said increment, it is ensured that the algorithm is not reprocessed before the expiry of a timer, preferably set to about 700 milliseconds.

Step 5: if the user has walked and the step has been incremented, the processor inserts a timer which prevents the execution of the algorithm in step 4 for at least t milliseconds (during tests a time of 700 ms was determined) and then the processor repeats the same algorithm.

Said algorithm renders the localization system intelligent, namely capable of counting the steps which the user takes, both analysing the peaks and classifying the trajectory of the path P of the user U, assessing whether the user is really walking, analysing each smallest and given time period.

Another algorithm renders the localization system even more intelligent with regard to evaluation of the orientation of the user U, by means of a combination of angle and initial reference position with respect to a predetermined axis X. The localization device T, rotating through an angle θ about the axis X, determines a rotation:

$$\text{rotation} = X * \sin\left(\frac{\theta}{2}\right)$$

where X is defined as the vectorial product of the axis Y by the axis Z. Initially said axis X is coplanar with the plane of the ground of the closed space in the position assumed by the device T, for example with reference to the direction East-West and towards East. Using this technology it is possible to develop a step counter which is very precise and designed to monitor the way in which the user U walks, remaining unaffected by false movements.

Owing to the synergic processing of the orientation, smart classification of the step, peak analyser and, in addition, a further estimate of the size of the step which depends on the dimensions of the map and also on the height of the user U, in addition to the method known in the literature by the name of particle filtering, the user is able to orient him/herself in the closed space, incrementing in real time and with extreme precision his/her own position, for example preferably displayed on a map shown on the localization device T, starting from a predetermined point S and with a regular walking movement to the end point E of the path P.

Figure 3:
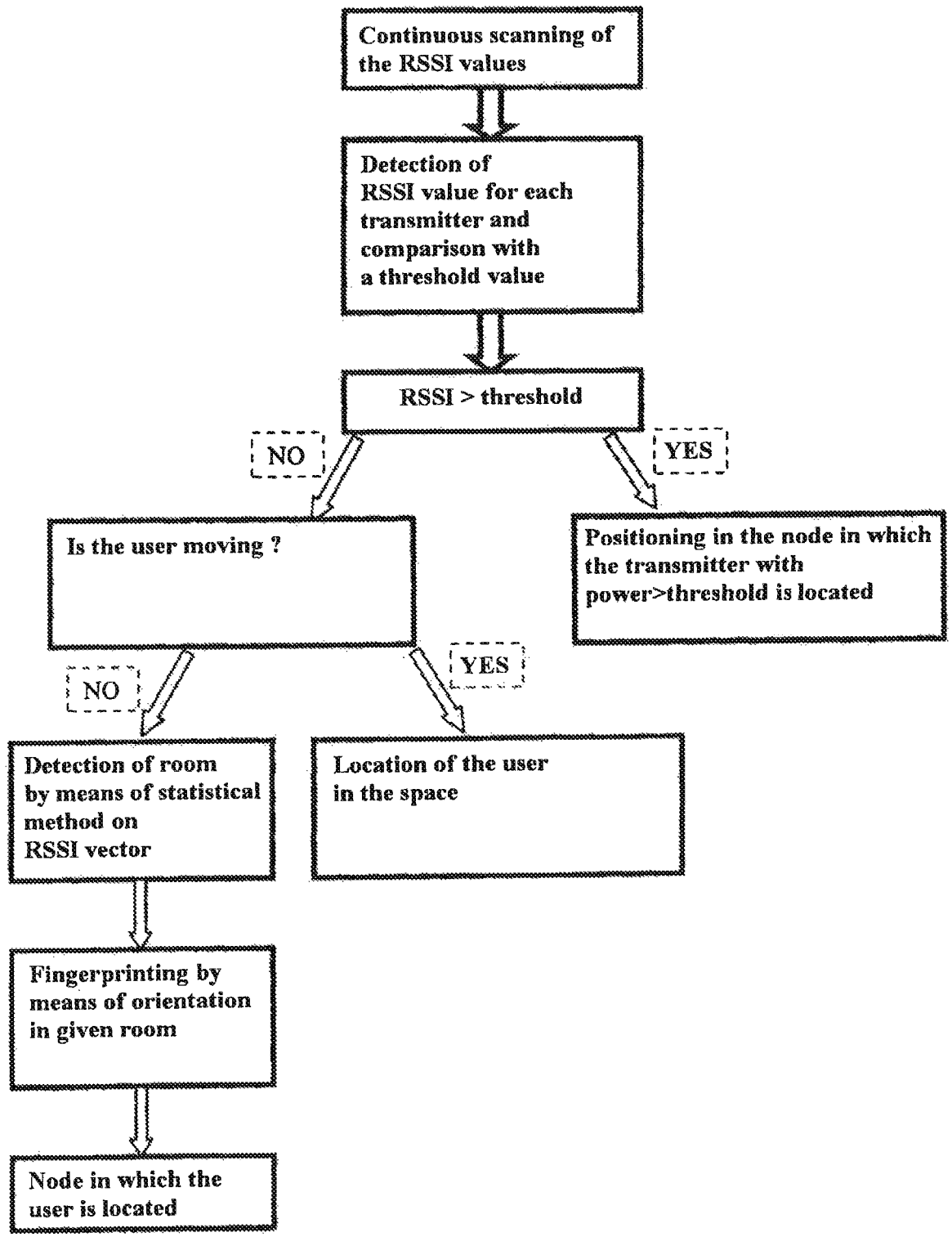
FIG. 3 is a flow diagram of the localization method according to the invention.

The merge of the localization models described in order to obtain a valid localization method which can be used within closed spaces, described below and with reference to the flow diagram in FIG. 3, makes it possible to obtain effective and efficient results in terms of precision, speed and environmental safety.

Operation is simple, but effective. When the user U starts the localization procedure, for example by executing an application on his/her own personal mobile electronic device which also functions as a localization device in the localization procedure or which is connected to a localization device configured to implement the localization procedure, the procedure comprises performing a scan of all the localization signal transmitter devices of the fingerprint type, recording the data internally and sending it to processing means, for example at an external web service. The latter is a service which may provide the user U instantaneously with a map of the location containing also the transmitters of the BT Smart localization signals, their type (whether of the Gate type V or fingerprint type F) and the node N in which they are positioned. The room 3 in which the user U is situated is determined by means of a probabilistic approach. By means of the RSSI vector obtained from a single scan and knowing that a localization signal transmitter belongs to only one room, a score is assigned to each room by means of the following formula:

$$\text{score}_{room} = \sum 1 - \left(\frac{|RSSI|}{|MaxScore|}\right)$$

where MaxScore is set to −1.

The room with the highest score is recognised as being the room in which the user U is most probably situated.

The application for the localization device will carry out simultaneously a second scan of the transmitters in order to consider also any simultaneous displacement of the user U and, by means of said technique of graph-based Bluetooth Smart fingerprinting with device orientation or the "Gate" technique, it will manage to obtain the centroid of the node N in which the user U is localized.

In order to avoid continuous communication between the localization device and the web service and provide a real-time service, it is preferable for processing of the application to be performed inside the localization device itself, while giving in any case the highest priority to the Gate technology. At the same time as operation of said application, execution of the IntelliWalk procedure verifies continuously the movement of the user U, monitoring whether he/she is walking or is at a standstill. With each operation for checking said speed of the user U, the position of the user will be incremented on the map by a walking unit. The length of the walking unit, equal to two steps of the user, may be preset as being equal to the height of the said user U, forming a valid empirical estimate from centimetres to pixels as to effectively how long a step is in the direction identified by the orientation module H integrated in the aforementioned procedure.

When the user U is at a standstill, i.e. when the classifier of the IntelliWalk procedure classifies a non walking condition (v=0 m/s), the application carries out a scan of the BT Smart transmitters both of the Gate V type and of the fingerprint F type, performing substantially a scan which is completed during a period preferably ranging between 3.5 and 9 seconds and at the same time checks again the position of all the BT Smart transmitters detected, then the various MAC Addresses of the same transmitters, checking also the correspondence with the types of transmitter B (i.e. if of the Gate or fingerprint type).

Preferably a higher priority is assigned to transmitters of the Gate type V than to fingerprint devices F.

If the scan detects that the RSSI value of a localization signal transmitter of the Gate type is higher than or equal to its threshold value, the user U will be localized at the centroid of the node N for that transmitter, otherwise localization will be performed by means of the method of graph-based Bluetooth Smart fingerprinting with device orientation, on the basis of the localization signals emitted by the transmitters of type F. In both cases it is possible to obtain an identifier (ID) of the node N in which the user U is to be localized. If the ID of the node N received at the output is different from the ID of the node N in which IntelliWalk procedure has defined the position of the user U who is walking, the position of the user U will be updated resetting it to the centre of the node N determined by means of one of the two previously mentioned methods, i.e. Gate or fingerprinting method. If the position defined coincides with the previous mapping, then nothing has changed. If, on the other hand, at the end of scanning the user U is still stationary, the operation of searching for the BT Smart transmitters is repeated.

The scanning operation is interrupted only when a movement state of the user U has been classified, namely if the user U is continuing to walk or has started to walk from a standstill position.

The advantages of the present localization method compared to those of the prior art are numerous and may be summarised as follows:

- high degree of localization reliability and precision due to the innovative merging of the three technologies discussed above;
- use of technologies which are also innovative, as in the case of IntelliWalk and Gate technologies, and innovative use thereof for the correct and optimum operation of the localization procedure;
- innovative use of the technology of graph-based Bluetooth Smart fingerprinting with device orientation, together with Bluetooth 4.0 low energy technology;
- innovative method of checking the orientation H of the user U;
- greater precision in checking for any transmitters not detected by the localization system, with real-time replacement of a predefined threshold value;
- greater checking precision of the localization method when the real-time scanning procedure is repeated, should more than one transmitter not be detected;
- processing decentralized to the receiver devices in the possession of the user U;
- continuous communication between the receiver and transmitter devices (beacons) B;
- localization not dependent upon spatial coordinates.

Obviously, without altering the principle of the invention, the embodiments and the constructional details may be greatly varied with respect to that described and illustrated purely by way of a non-limiting example, without thereby departing from the scope of the invention as defined in the accompanying claims.

The invention claimed is:

1. A method for localization in an indoor space of a user equipped with a localization device having signal receiver means and means for detecting the orientation in a predetermined spatial reference system, wherein said indoor space is divided up into a plurality of rooms each of which includes a plurality of spatial volumes or areas, which are connected together in a directed-graph arrangement, the method comprising:
    arranging in said indoor space a plurality of gate radio transmitters and fingerprinting radio transmitters designed to each emit a respective localization signal adapted to be detected by said receiver means, wherein the gate radio transmitters are positioned for each obligatory access point, wherein said fingerprinting radio transmitters are present in the plurality of rooms and are not positioned in the obligatory access points of users, and wherein a database stores each room, respective radio transmitters and their signal strengths across various orientations in the room;
    characterised in that the method comprises in combination the following steps:
        detecting, by the receiver means, localization signals emitted by the gate radio transmitters;
        comparing the signal strength of the localization signals detected with a predetermined threshold value to localize the localization device in a spatial volume or area associated with a respective gate radio transmitter whose respective localization signal is detected as having a signal strength higher than said threshold value;
        in response to determining that the localization signals with a signal strength higher than said threshold value are not detected, determining a movement condition of the localization device;
        when the localization device is determined to be static by determining that a velocity of the localization device is approximately zero:
            determining the room in said indoor space where said localization device is present based on comparing signal strength of localization signals emitted by the fingerprinting radio transmitters and detected by the receiver means with stored signal strengths of the fingerprinting radio transmitters stored in the database based on an orientation of the localization device;
            constructing a vector including signal strengths of signals received from fingerprinting radio transmitters associated with said room and orientation data of the localization device in the indoor space; and
            comparing said vector with a set of vectors of the fingerprinting radio transmitters predetermined during a training step and determining the localization of said localization device in the spatial volume or area associated with the localization vector closest to the localization vector acquired, and
        when the localization device is moving by determining that a speed of the device is greater than approximately zero:
            interrupting detecting the localization signals emitted by said gate radio transmitters and by said fingerprinting radio transmitters; and
            tracking the localization device by inertial navigation, wherein, when the localization device is determined to be static, an identifier is obtained of the spatial volume or area in which the localization device is localized through said gate radio transmitters or through said fingerprinting radio transmitters, and when the obtained identifier is different from an identifier of the spatial volume or area in which the localization device has been tracked by inertial navigation, the localization of the localization device is updated to the center of the spatial volume or area determined through said gate radio transmitters or through said fingerprinting radio transmitters.

2. The method according to claim 1, wherein the gate radio transmitters are arranged in gates for access to the rooms of said indoor space or in proximity of predetermined points of said rooms.

3. The method according to claim 1, wherein said training step comprises the determination of a set of localization vectors for each spatial volume or area in a plurality of discrete orientations in a predetermined spatial reference system.

4. The method according to claim 1, wherein the localization signals not received from one of said fingerprinting radio transmitters are replaced by dummy localization signals with a predetermined threshold value.

5. The method according to claim 1, wherein, if localization signals are not received from a plurality of fingerprinting radio transmitters, the step of detection by the receiver means of the localization signals emitted by a plurality of gate radio transmitters is carried out after a predetermined wait time.

6. The method according to claim 1, wherein the comparison of said localization vector with a set of predetermined localization vectors is carried out using a K-Nearest Neighbor technique with weighted Manhattan distance comparison metric.

7. The method according to claim 1, wherein the comparison of said localization vector with a set of predetermined localization vectors is performed in accordance with a machine learning technique using support vector machines, SVM, with RBF Kernel and search grid tuning.

8. The method according to claim 1, wherein environmental noise factors from a different fingerprinting transmitter and a random Gaussian noise representing the localization signals emitted by a set of fingerprinting transmitters are removed from the localization signals received by the fingerprinting radio transmitters.

9. The method according to claim 1, wherein the localization of said localization device in the spatial volume or area associated with the respective gate radio transmitter of said gate radio transmitters, the localization signal of which is detected as having a power higher than said threshold value, comprises the localization of the localization device in the center of the spatial volume or area corresponding to said respective gate radio transmitter.

10. The method according to claim 1, wherein the tracking of the localization device on the basis of a movement condition comprises counting steps of the user and acquiring orientation data of the localization device.

11. The method according to claim 10, wherein counting of the user's steps includes classification of a movement condition and a comparison of the current values for acceleration of the localization device along a number of Cartesian reference axes, with preceding acceleration values.

* * * * *